(12) United States Patent
Pouraminaein et al.

(10) Patent No.: US 12,531,448 B2
(45) Date of Patent: Jan. 20, 2026

(54) ROTOR TOPOLOGY FOR A PERMANENT MAGNET MACHINE

(71) Applicant: NEWSOUTH INNOVATIONS PTY LIMITED, Sydney (AU)

(72) Inventors: Alireza Pouraminaein, Sydney (AU); Fazlur Rahman, Sydney (AU); Rukmi Dutta, Sydney (AU)

(73) Assignee: NEWSOUTH INNOVATIONS PTY LIMITED, Sydney (AU)

( * ) Notice: Subject to any disclaimer, the term of this patent is extended or adjusted under 35 U.S.C. 154(b) by 194 days.

(21) Appl. No.: 18/248,621

(22) PCT Filed: Oct. 12, 2021

(86) PCT No.: PCT/AU2021/051190
§ 371 (c)(1),
(2) Date: Apr. 11, 2023

(87) PCT Pub. No.: WO2022/077056
PCT Pub. Date: Apr. 21, 2022

(65) Prior Publication Data
US 2024/0072582 A1      Feb. 29, 2024

(30) Foreign Application Priority Data
Oct. 12, 2020   (AU) ................................ 2020903693

(51) Int. Cl.
*H02K 1/2706*      (2022.01)
(52) U.S. Cl.
CPC ....... *H02K 1/2706* (2013.01); *H02K 2213/03* (2013.01)

(58) Field of Classification Search
CPC . H02K 1/2706; H02K 1/2766; H02K 2213/03
See application file for complete search history.

(56) References Cited

U.S. PATENT DOCUMENTS

2004/0007930 A1*   1/2004   Asai ..................... H02K 21/14
                                              310/156.53
2011/0291515 A1*  12/2011   Li ......................... H02K 21/16
                                              310/156.53
(Continued)

FOREIGN PATENT DOCUMENTS

EP         3002854 A2    4/2016
EP         3675329 A1    7/2020
JP      2014183691 A    9/2014

OTHER PUBLICATIONS

"International Preliminary Report on Patentability", International Application No. PCT/AU2021/051190, Apr. 13, 2023, 5 pp.
(Continued)

*Primary Examiner* — Oluseye Iwarere
*Assistant Examiner* — Masoud Vaziri
(74) *Attorney, Agent, or Firm* — Myers Bigel, P.A.

(57) ABSTRACT

An IPM rotor with a spoke-type magnet ring layer superposed around a V-type magnet ring layer is described. The spoke annulus is radially distal the V-type annulus. Broadly speaking, there is described a Y-type IPM rotor wherein a plurality of generally Y-shaped internal permanent magnets are disposed around a circumferential region of the rotor, each of the generally Y-shaped permanent magnets including a stem and a plurality of di-verging arms extending from a head end therefrom, and oriented such that a base of the stem is disposed adjacent the rotor circumference. An FSCW machine with the Y-type IPM rotor is also described.

25 Claims, 12 Drawing Sheets

(56) References Cited

U.S. PATENT DOCUMENTS

| | | | | |
|---|---|---|---|---|
| 2013/0002081 | A1* | 1/2013 | Zhang | H02K 21/024 |
| | | | | 310/156.53 |
| 2013/0113328 | A1* | 5/2013 | Kogure | H02K 1/274 |
| | | | | 310/156.53 |
| 2014/0015364 | A1* | 1/2014 | Iwatsu | H02K 1/272 |
| | | | | 310/156.53 |
| 2014/0091663 | A1* | 4/2014 | Hazeyama | H02K 1/276 |
| | | | | 310/156.11 |
| 2017/0125164 | A1* | 5/2017 | Yoshida | H01F 41/0273 |
| 2017/0317540 | A1* | 11/2017 | Laldin | H02K 1/2766 |
| 2020/0381972 | A1* | 12/2020 | Momen | H02K 3/42 |
| 2021/0135522 | A1* | 5/2021 | Dong | H02K 1/2773 |

OTHER PUBLICATIONS

"International Search Report and Written Opinion of the International Searching Authority", International Application No. PCT/AU2021/051190, Nov. 17, 2021, 9 pp.

* cited by examiner

ROTOR TOPOLOGY FOR A PERMANENT MAGNET MACHINE

RELATED APPLICATIONS

This application is a 35 U.S.C. § 371 national stage application of PCT Application No. PCT/AU2021/051190, filed on Oct. 12, 2021, which claims priority from Australian Patent Application No. 2020903693, filed on Oct. 12, 2020, the contents of which are incorporated herein by reference in their entireties. The above-referenced PCT International Application was published in the English language as International Publication No. WO 2022/077056 A1 on Apr. 21, 2022.

TECHNICAL FIELD

The present invention relates generally to electric machines.

BACKGROUND

Electrical machines generate and deploy about half of the world's energy. In response to global warming, many standards such as the National Electrical Manufacturers Association (NEMA), the International Electrotechnical Commission (IEC) and Energy Policy Act (EPAct) have set enhanced performance requirements for electrical machines. There are several factors by which high-performance electric machines are characterized and measured; among them, high efficiency, low torque ripple, high torque density, high power factor, low harmonic content, fast dynamics, mechanical robustness, low maintenance, manufacturability, cost-effectiveness, and sustainability are considered as of high importance.

Among all types of electrical machines, permanent magnet synchronous machines (PMSMs) demonstrate higher performance in terms of the factors mentioned above. PMSMs provide several advantages such as high efficiency, high torque density, overload capability, robustness, low maintenance cost, compactness and low weight. Consequently, in the last two decades, PMSMs have been chosen for many high-performance applications such as electric vehicles (EVs), medical devices, power plants, renewable wind energy systems, actuators and so on.

In the family of PMSMs, those that employ interior permanent magnet (IPM) rotors are gaining attention due to their mechanical robustness and superior performance at extended speed range.

Applications of PMSMs

PMSMs can cover a wide range of commercial applications from low-speed to high-speed applications. Low-speed applications such as wind-turbine generators, washing machines, marine propulsions, elevators often require a high number of poles and high torque density. For these applications, fractional-slot concentrated winding (FSCW) PMSMs are suitable. Especially, when available space is limited as it is the case for the most of low-speed applications. The FSCW stators with high numbers of poles require fewer stator slots. Thus, a higher fill factor can be achieved with far less effort, shorter end windings offer a remarkable potential to reduce the machine copper losses, volume and manufacturing costs.

In case of wind turbines, the main benefit of a direct drive is the reduction of failures and maintenance which can be obtained by removing gearbox and using PM generators. However, a commercial example of using a wind turbine FSCW PM has not been reported in the literature. Recently, a 42-pole, 54-slot FSCW IPM generator was designed and built at UNSW for direct-drive wind turbine applications. Many direct-drive commercial washing machines have used FSCW motors. There, the drum of the motor rotates approximately at 50 rpm during the washing process, up to approximately 1500 rpm or higher during the drain. Therefore, the direct-drive motor of the washing machines should run over a large speed range which is achieved by operating under the field-weakening regime.

For high-speed applications, PMSMs provide a unique advantage as they can deliver constant power over a wide range of speed provided that their characteristic current is close to the rated current. The characteristic current determines the capability of PMSMs to weaken the airgap flux for reducing the back-EMF voltage and keep the terminal voltage constant at the rated value, when the speed is over the rated value. When the characteristic current is equal to or smaller than the rated current of the PMSMs, a wide CPSR is achievable.

Regardless, uses of PMSM in commercial applications are still few and far between. One of the reasons behind this is the wider design space of the PMSM, to find a global optimum topology for a specific high-performance application.

State-of-the-Art in PMSMs

Generally, PMSMs have two parts, stator and rotor. The stator can employ different winding configurations such as distributed winding (DW) and concentrated winding (CW). The rotor of PMSMs can use surface PMs or interior PMs (IPMs). The present technology relates generally to PMSMs with interior PMs.

Structure of Stators

Slot and Pole Combinations and Winding Layouts for PMSMs

Regarding the commonly employed stator windings types, a wide variety of possibilities exist. Usually, the winding types are classified depending on the number of slots per pole and per phase, $S_{PP}$ as:

$$S_{pp} = \frac{Q}{m \times P}$$

where Q is the number of stator slots, P is the number of poles, and m is the number of phases. Integral-slot windings are those in which $S_{PP}$ is an integer number, while fractional windings usually refer to those for which $S_{PP}$ is a fraction higher than unity.

Traditionally, integral-slot windings with $S_{PP} \geq 1$ have been termed distributed-windings (DW). Fractional-slot concentrated windings (FSCW) refer to a subclass of AC windings for which $S_{PP}$ is a fraction, less than unity. An alternative classification is also used in the literature as overlapping and non-overlapping windings, based on whether the end-winding of the machine overlap or not. Machines with DW lead to the end-windings to overlap, while the coils of FSCW machines are concentrated around the single tooth, and any overlap with other phase end-windings is eliminated. For this reason, FSCWs are sometimes termed as non-overlapping windings or tooth-coil windings. Finally, the winding types can be further classified according to the number of layers in the slots as, single-layer, double-layer or multilayer windings.

DW stators have been used more commonly for PMSMs as they offer a sinusoidal magneto-motive force (MMF). The manufacturing procedure for the mass production of DW stators has been established for many years as almost all industrial induction machines are using DW stators. However, FSCW machines open a new area of research to design a high-performance IPM machine. FSCW PMSMs with a proper slot and pole combination outperform PMSMs with DW stator in several aspects such as:

- reduction of coming torque due to a large least common multiple (LCM) between the number of poles and the number of slots,
- reduction of copper losses due to shorter end-winding length, and hence, reduction of machine total length,
- increased flux-weakening capability due to the contribution of the sub- and high order MMF harmonics in the increase of machine inductances,
- reduction of short-circuit current due to higher leakage inductance,
- increased fault-tolerant capability due to the reduction of mutual inductance.

In relation to FSCW PMSMs, not all combinations of slots and poles for an FSCW stator yield acceptable performances. The slot and pole combination should be selected based on the associated winding factor, cogging torque, torque ripple, vibration, and losses. The main winding factor is desired to be as high as possible in order to maximize the torque production.

The higher the number of layers increases the complexity of the winding configuration and reduces the fault-tolerant capability of FSCW PMSM. It has been shown that double-layer windings provide a trade-off in the MMF harmonics, fault-tolerance, complexity and performances of FSCW PMSMs. Therefore, in this specification, double-layer windings are used for the FSCW IPM machines.

The cogging torque in an FSCW PMSM is evaluated based on the LCM of the number of slots and poles. When comparing FSCW stators, a higher value of LCM usually leads to a lower peak value for the developed cogging torque.

For FSCW stators with a high synchronous speed, only 12/10, 12/14 and 18/14 are suitable candidates as they have 10 poles and 14 poles respectively, and their mutual inductances are limited to leakage inductance terms only. For this reason, these combinations have been frequently used for FSCW PMSMs. The winding layout of FSCW PMSM with double-layer winding and a low number of poles are well-established. 12/10, 12/14 and 18/14 FSCW stators will be used in this specification.

Recent Developments in Stator Structure for FSCW Machines

Efforts have been made to establish the performance characteristics of different slot and pole combinations of the FSCW PM machines. Various slot and pole combinations for FSCW machines and design considerations have been investigated.

It has been shown that a low number of poles allows operation at relatively low supply frequencies which decreases the losses in the drive system. Hence, high efficiency and high torque can be achieved with these slot and pole combinations together with a wide constant-power speed range.

Rotor Topologies for PMSMs

The most common rotor topologies that have been reported in the literature for PMSMs are Surface PM, Inset PM, V-type, Double-layer V-type, Spoke Type, Multi-layer, and Flat-type.

Recent Developments in Interior Permanent Magnet Rotors

The configuration of interior PM rotor has been investigated, especially after the establishment of the capability of IPM motors for flux-weakening and extended-speed operation range.

One of the key advantages of IPM rotor is its high d-axis inductance, which can be employed to reduce the PM excitation flux requirements in order to achieve extended-speed operating ranges.

Another key advantages of IPM rotor is it saliency. High saliency ratio provides reluctance torque, which help the motor to maintain the required torque under constant power speed range (CPSR). A simpler topology with a high saliency ratio, which is easier to manufacture is PM-assisted synchronous reluctance machines (PMAREL). PMARELs can reduce the expensive rare-earth PM, which enhances the popularity of this type of PMSMs in the last decade. However, it has been shown that PMARELs with FSCW stators cannot demonstrate satisfactory performance in terms of torque ripple, torque density and rotor losses. The effect of concentrated winding on saliency ratio of FSCW IPM machines has been investigated. It has been shown that the saliency ratio of FSCW IPM machines is intrinsically low due to the presence of MMF harmonics and wide stator teeth. Also, any attempt to improve the saliency ratio of such machines results in the reduction of other performances such as torque density, efficiency and CPSR.

With a surge in the price of rare-earth magnets, the reduction of NdFeB magnets or the use of ferrite magnets in IPM rotors attracts much attention. The target was to decrease the dependency on rare-earth magnets. Apart from PMAREL which can be considered as one of the best approaches to reduce magnets, spoke-type topologies with ferrite magnets were reported in the literature to increase their torque density. In fact, spoke-type rotors enhance the flux concentration compared with other rotor topologies.

Generally, there are two methods to evaluate the performance characteristics of PMSMs—analytical and finite element method. A proper analytical method provides detailed information regarding the effect of the machine geometry on its characteristics. However, using analytical methods for performance evaluation of PMSMs with IPM rotors have always been challenging due to:

- a wide variety of possible configurations for inserting magnets inside the rotor, which leads to different rotor topologies,
- the existence of local saturation on the iron bridges. As the level of saturation is progressively reduced from iron bridges to pole arc, the precise estimation of the PM flux density using analytical methods becomes very challenging.

Over the past two decades, as FSCW started gaining attention, one of the key challenges was to derive an analytical method for analysis of magnetic field generated by the FSCW stator. Combining the complexity of IPM rotor with MMF harmonics makes analytical methods impractical for large-scale design optimization of FSCW IPM machine where different slot and pole combinations and rotor topologies have to be considered and evaluated over their entire operating range. On the other hand, FEA is more accurate and can be used for performance evaluation of complex structures. However, FEA is time-consuming for large-scale design optimization problems.

Owing to the developments in electromagnetic FEA and the increase of processing power of computational resources, population-based design optimization of electric machines using high fidelity FE models has become an established practice. Several authors proposed various FE-based optimization techniques to achieve this goal.

Definitions

It is to be understood that throughout this specification, the phrases "Y-shaped" and "Y-type" refers to a general shape of permanent magnet disposed within the rotor of an IPM machine. It is to be understood that the Y-shape may extend to various shapes, generally covered by the concept of Y-shape. By way of non-limiting example, the designation "Y-shape" may extend to:
- a goblet-shaped permanent magnet, wherein the upper branches of the Y are curved inwards so as to be concave-upwards; or
- a counterbored-shape permanent magnet, wherein the upper branches of the Y are formed into orthogonal branches; or
- a funnel-shaped or horned permanent magnet where the upper branches of the Y flare outwards at various portions therealong so as to be concave-downwards like, say, rams horns; or
- a star-shaped permanent magnet, being a three-pointed star where one of the arms of a star forms a stem and the other two arms are evenly or non-evenly angularly-spaced therefrom and of similar lengths; or
- a short, thick, stubby stem having a head end and a base end, and a plurality of arms diverging from the head end; or
- a stem with a double-, or triple-, or quadruple-set of diverging arms extending generally therefrom, the diverging arms being spaced from and parallel to one another, or angled from each other so as to be radiating generally from a head end of the stem.

Furthermore, "spoke" and "stem" may be used interchangeably throughout the specification so as to indicate a radially-extending permanent magnet.

SUMMARY

It is an object of the present invention to substantially overcome, or at least ameliorate, one or more disadvantages of existing arrangements.

Broadly, the present disclosure provides an IPM rotor with a spoke or stem-type magnet ring layer superposed around a V-type magnet ring layer.

In one arrangement the spoke annulus is radially distal the V-type annulus. In one arrangement the spoke magnets are aligned with the base of a V. In other arrangements the spoke magnets are angularly offset from the base of the V-type magnets so that the magnet arrangement is a tree-type, rather than a Y-type or star-type.

Broadly, the present disclosure also provides an IPM rotor with a Y-type magnet topology.

Broadly, the present disclosure also provides an electric machine with a Y-type rotor magnet topology.

In accordance with one aspect of the present disclosure, there is provided a Y-type IPM rotor wherein a plurality of generally Y-shaped internal permanent magnets are disposed around a circumferential region of the rotor, each of the generally Y-shaped permanent magnets including a stem and a plurality of diverging arms extending from a head end therefrom, and oriented such that a base of the stem is disposed adjacent the rotor circumference.

In accordance with another aspect of the present disclosure there is provided a Y-type IPM machine which includes: a rotor wherein a plurality of generally Y-shaped internal permanent magnets are disposed around a circumferential region of the rotor, each of the generally Y-shaped permanent magnets including a stem and a plurality of diverging arms extending from a head end therefrom, and oriented such that a base of the stem is disposed adjacent the rotor circumference.

In one aspect the generally Y-shaped magnet includes one stem and two arms.

In one aspect the ratio of stem magnet width to rotor yoke is between 0.01 and 0.99 provided that the rotor geometry is feasible.

In one aspect the ratio of arm magnet width to rotor yoke is bigger than provided that the rotor geometry is feasible.

In one aspect the length of arm magnets in the star-shaped magnets are unequal with even or uneven angle.

In one aspect the length of arm magnets in the two adjacent star-shaped magnets are unequal with even or uneven angle.

In one aspect the ratio of arm magnet thickness to stem magnet thickness is bigger than 0.1 provided that the rotor geometry is feasible.

In one aspect the thickness of the stem magnet is larger than 0.01 mm provided that the rotor geometry is feasible.

In one aspect the thickness of the arms of the magnet are bigger than provided that the rotor geometry is feasible.

In one aspect, the iron bridge between the spoke and airgap (rotor surface) can be removed.

In one aspect, the thickness of the iron bridge between the spoke and airgap (rotor surface) is larger than zero.

In one aspect, the iron bridge between the spoke and the V-type rotor ring layers can be removed.

In one aspect, the thickness of the iron bridge between the spoke and the V-type rotor ring layers is larger than zero.

In one aspect, the thickness of the iron bridge between the spoke and airgap (rotor surface) of all star-shape magnets are even.

In one aspect, the thickness of the iron bridge between the spoke and airgap (rotor surface) of all star-shape magnets are unequal.

In one aspect the magnet air gap is between about 0.1 and 5 mm.

In one aspect the iron bridge thickness between the outer ends of two diverging arms is between about 0.1 and 5 mm.

In one aspect the number of slots is larger than 4.

In one aspect the number of poles is larger than 2.

In one aspect the machine is a Fractional Slot machine.

In one aspect the machine is a Distributed Winding machine.

In one aspect the machine is a Concentrated Winding machine.

In one aspect the machine is a Fractional Slot Concentrated Winding machine (FSCW).

In one aspect the geometric parameters of the stem portion of the Y-type magnets are defined as set out in the parametric equation set out below $$\begin{cases} x_{m1} = \left(\frac{1}{2}D_i - g - b_{th}\right)\cos\left(\frac{1}{2}\theta_{mt}\right) \\ y_{m1} = -\left(\frac{1}{2}D_i - g - b_{th}\right)\sin\left(\frac{1}{2}\theta_{mt}\right) \end{cases}$$

$$\begin{cases} x_{m2} = x_{m1} \\ y_{m2} = -y_{m1} \end{cases}$$

$$\begin{cases} x_{m3} = \left(\frac{1}{2}D_i - g - b_{th} - m_d\right) \\ y_{m3} = \frac{1}{2}m_{th} + m_g \end{cases}$$

$$\begin{cases} x_{m4} = x_{m3} \\ y_{m4} = -y_{m3} \end{cases}$$

where θ*mt* is given as:

$$\theta_{mt} = 2\sin^{-1}\left(\frac{0.8m_{th}}{2\left(\frac{1}{2}D_i - g - b_{th}\right)}\right)$$

and Di=stator inner diameter
g=gap between stator and rotor
$b_{th}$=thickness of iron bridge at rotor circumference
$m_{th}$=magnet thickness
$m_g$=magnet air gap clearance
$m_d$=radial air gap at base of magnet In one aspect the geometric parameters for the vertices of the diverging arm portion of the magnets are defined by the parametric equations set out below:

$$\begin{cases} x_{m1} = \sqrt{\left(\frac{1}{2}D_{aux} - g - 0.5\right)^2 - \left(\frac{1}{2}m_{th\_spoke} + m_{th\_V} + 2m_g - b_1\right)^2} \\ y_{m1} = \left(\frac{1}{2}m_{th\_spoke} + m_{th\_V} + 2m_g - b_1\right) \end{cases}$$

$$\begin{cases} x_{m2} = \left(\frac{1}{2}D_{aux} - g - 0.5\right)\cos(\theta_{mb}) \\ y_{m2} = \left(\frac{1}{2}D_{aux} - g_o - 0.5\right)\sin(\theta_{mb}) \end{cases}$$

$$\begin{cases} x_{m4} = \left[x_{m3} - (m_{th\_V} + 2m_g)\sin\left(\frac{1}{2}\theta_p + \theta_3\right)\right]\cos(\theta_p) \\ y_{m4} = \left[y_{m3} - (m_{th\_V} + 2m_g)\sin\left(\frac{1}{2}\theta_p + \theta_3\right)\right]\sin(\theta_p) \end{cases}$$

$$\begin{cases} x_{m5} = x_{m3} - (m_{th\_V} + 2m_g)\sin(\theta_3) \\ y_{m5} = y_{m3} - (m_{th\_V} + 2m_g)\sin(\theta_3) \end{cases}$$

where $m_{th\_v}$ is the magnet thickness of V-type magnets, and wherein $\theta_{mb}$ and $\theta_{mb}$ are defined as:

$$\theta_{mb} = \tan^{-1}\left(\frac{x_{m1}}{y_{m1}}\right) + 2\sin^{-1}\left(\frac{m_{th\_V} + 2m_g}{2\sqrt{x_{m1}^2 + y_{m1}^2}}\right)$$

$$\theta_3 = \tan^{-1}\left(\frac{y_{m3} - y_{m1}}{x_{m1} - x_{m3}}\right)$$

and $$D_{aux} = D_i - 2(g + b_{th} + 2m_d + m_{w\_spoke}).$$

Advantageously, one or more aspects of the present disclosure provide low torque ripple, an increase in torque density by improving flux concentration and reluctance torque. Saliency improvements can be improved. Furthermore, mechanical integrity of the rotor can be improved due to a rotor yoke between the shaft and the diverging arms of the new magnet arrangement.

In addition, by changing the mix between spoke-type and V-type magnet sections in the Y-type topology rotor, the Y-type topology rotor can behave either just like a spoke-type rotor or just like a V-type rotor, but with the structural and electrical advantages of a combination of both.

Therefore, theoretically, a Y-type rotor can deliver low torque ripple without sacrificing torque density and maintaining high rotor integrity.

Clarifications

In this specification, where a document, act or item of knowledge is referred to or discussed, this reference or discussion is not an admission that the document, act or item of knowledge or any combination thereof was at the priority date:
(a) part of common general knowledge; or
(b) known to be relevant to an attempt to solve any problem with which this specification is concerned.

It is to be noted that, throughout the description and claims of this specification, the word 'comprise' and variations of the word, such as 'comprising' and 'comprises', is not intended to exclude other variants or additional components, integers or steps.

BRIEF DESCRIPTION OF THE DRAWINGS

In order to enable a clearer understanding, an embodiment of the technology will now be further explained and illustrated by reference to the accompanying drawings, in which.

DETAILED DESCRIPTION INCLUDING BEST MODE

Figure 1:
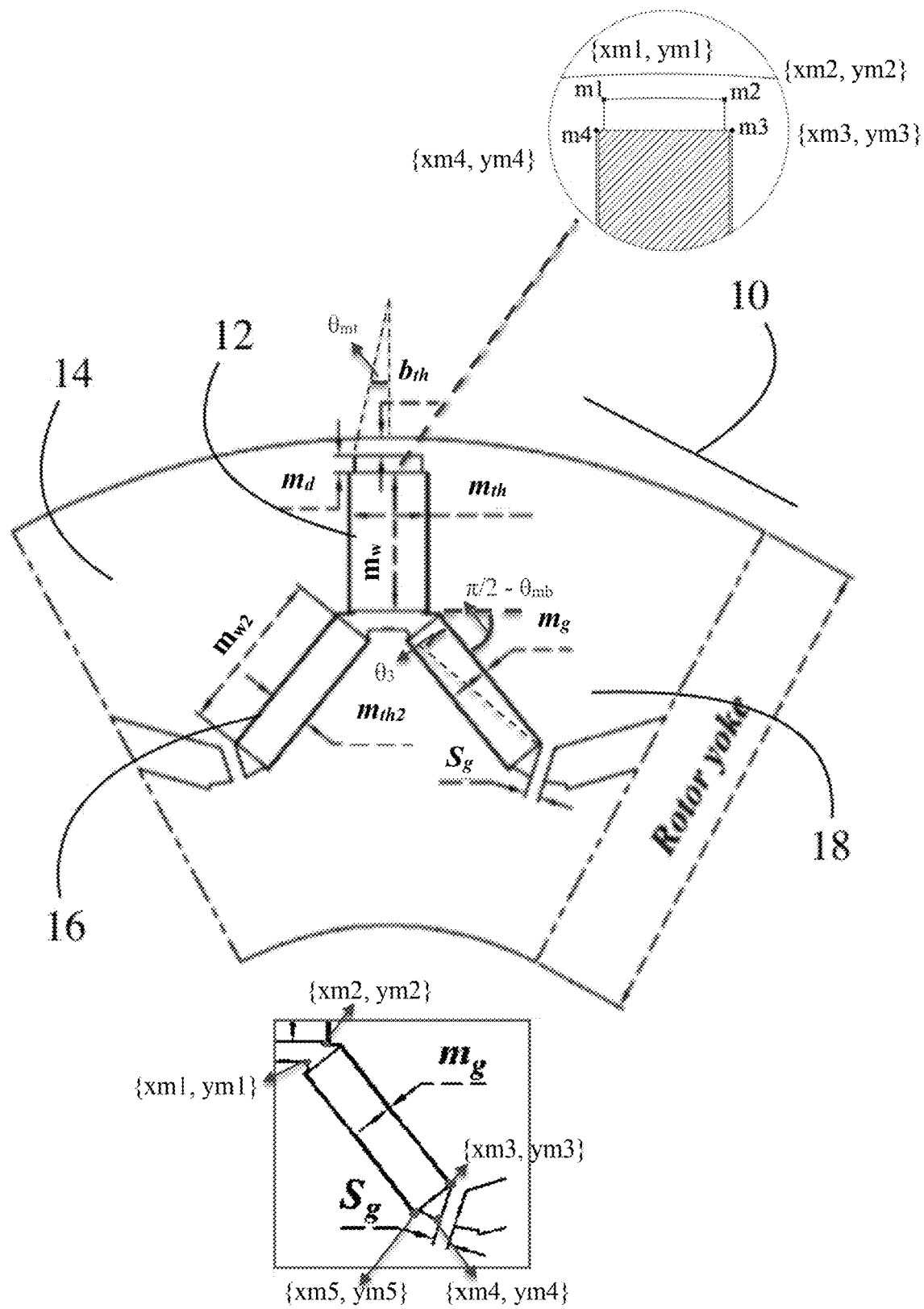
FIG. 1 is a detail view of a generally Y-type rotor topology, showing parameters which assist in defining the geometry thereof, according to the present disclosure.
Figure 2:
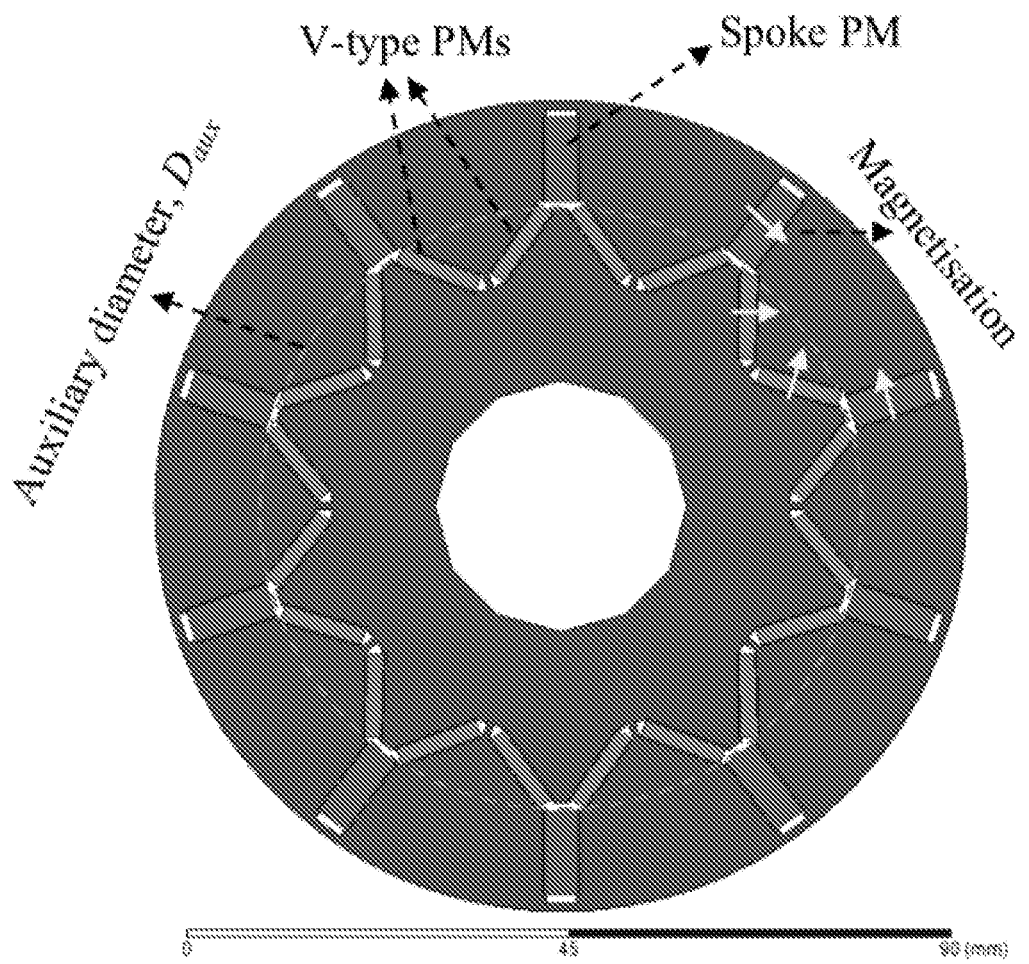
FIG. 2 is a section view of a rotor which has the generally Y-type topology, marked with certain parameters to assist in the parametric definition thereof.

Referring to FIG. 1 there is shown a Y-type rotor for an Internal Permanent Magnet machine.

The inventors used optimisation algorithms to examine five FSCW IPM rotor topologies based on various metrics including torque, efficiency, and material cost.

The rotor topologies examined were:
flat;
double flat;
V;
double V; and
spoke.

Three slot and pole combinations were examined for each rotor topology, such that fifteen case studies were interrogated. Various slot and pole combinations were reviewed such that there were $S_{pp}$ ratios of ⅖, 2/7 and 3/7 examined for each rotor topology.

The optimisation software, as parameters, utilised standard frame size IEC100 with an inner diameter of 152 mm, and the effective stack length of each candidate was scaled to produce the nominal torque; 7 Nm, which corresponds to 1 kW output power rating at 1370 rpm. The calculation of the nominal torque is performed under MTPA operation for the given rated current density. With these considerations, the multi-objective optimization was performed to find the Pareto-front configurations for the selected fifteen case studies.

Scatter plots were generated for 4392 candidate configurations corresponding to 50 iterations and the population size of 80 for characteristic current and torque ripple. Certain observations were made, and metrics formulated, such as torque ripple, torque density, characteristic current, saliency ratio, magnet mass, torque per magnet, efficiency, and material cost.

It was identified that V-type and spoke type rotor topologies had high performance on some of these metrics.

Even though both the V-type and spoke-type rotor configurations have good performances in terms of torque density, material cost and efficiency than the other rotor topologies, it was observed that both topologies have shortcomings such as high torque ripple (in V-type), and low torque density in spoke-type.

This is a very complex area and it can be seen from the discussion in the background of this patent specification that changing one variable in the configuration an electric motor can have deleterious results on performance, when the opposite was expected.

Selected configurations were then modelled on an FEA system. (FIG. 4a, 4b, 5a, 5b).

The present inventors then superposed two topologies in a new Y-type rotor topology. Surprisingly, the results were found to be an improvement. For example, the distribution of $I_{ch}$ of the Y-type topology rotor is similar to that of the V-type rotor. It can also be seen that the torque ripple of Y-type rotors is less than that of V-type rotors, and it is slightly higher than the spoke-type rotor. The Y-type rotor according to the present disclosure with high efficiency have a higher cost, lower $\gamma_{max}$ and higher saliency ratio as well as a higher power factor.

The geometric parameters of the disclosed FSCW Y-type rotor configuration are listed in the table below. The disclosed configuration with Y-type rotor has a shorter stack length by at least 1.0 mm and up to 3.5 mm, than those of the known rotor topologies V-type, Spoke-type and Double V-type.

| Parameter | Unit | Y-type |
| --- | --- | --- |
| Yoke | mm | 6.16 |
| TWS | Mm | 12.18 |
| Di | mm | 91.86 |
| $S_o$ | Mm | 4.53 |
| $m_{th}$ | Mm | 4.0 |
| $m_{th2}$ | Mm | 2.0 |
| $m_w$ | M | 11.53 |
| $m_{w2}$ | mm | 7.52 |
| Stack length | Mm | 23.0 |

The table below compares the nominal performances of the disclosed FSCW Y-type rotor configuration with V-type, spoke-type and Y-type rotor in a pu system. The performances of V-type IPM machines are considered as the base values of the pu system. In comparison with V-type and spoke-type rotors, the disclosed configuration with Y-type rotor presents:

7% and 20% increase in torque density, respectively

2% and 11% reduction in active material cost, respectively

7% and 11% reduction in total mass, respectively.

| | Units | V-type | Spoke type | Y-type |
| --- | --- | --- | --- | --- |
| Performance | | | | |
| Torque density | [Nm/kg] | 1 | 0.87 | 1.07 |
| Torque per magnet weight | [Nm/kg] | 1 | 0.79 | 0.97 |
| Efficiency at base speed | [%] | 1 | 1.00 | 1.00 |
| Total loss | [pu] | 1 | 1.03 | 1.02 |
| $\gamma_{max}$ | [deg.] | 1 | 0.90 | 0.94 |
| CPSR | | 1 | 1.00 | 1.00 |
| Torque ripple | [%] | 1 | 0.40 | 0.56 |
| Saliency ratio | | 1 | 0.88 | 0.94 |
| Power factor | | 1 | 1.03 | 1.04 |
| Mass distribution | | | | |
| Active material cost | [po] | 1 | 1.11 | 0.98 |
| Total active mass | [pu] | 1 | 1.04 | 0.93 |
| PM mass | [pu] | 1 | 1.23 | 1.00 |
| Copper mass | [pu] | 1 | 1.13 | 1.06 |
| Steel mass (after die cut) | [pu] | 1 | 0.98 | 0.87 |

Furthermore, geometric parameters were identified for the Y-type permanent magnet. First, it was identified that the parameters of the diverging arm portions of the magnets were governed by the model below:

$$\begin{cases} x_{m1} = \sqrt{\left(\frac{1}{2}D_{aux} - g - 0.5\right)^2 - \left(\frac{1}{2}m_{th\_spoke} + m_{th\_V} + 2m_g - b_1\right)^2} \\ y_{m1} = \left(\frac{1}{2}m_{th\_spoke} + m_{th\_V} + 2m_g - b_1\right) \end{cases}$$

$$\begin{cases} x_{m2} = \left(\frac{1}{2}D_{aux} - g - 0.5\right)\cos(\theta_{mb}) \\ y_{m2} = \left(\frac{1}{2}D_{aux} - g_o - 0.5\right)\sin(\theta_{mb}) \end{cases}$$

$$\begin{cases} x_{m4} = \left[x_{m3} - (m_{th\_V} + 2m_g)\sin\left(\frac{1}{2}\theta_p + \theta_3\right)\right]\cos(\theta_p) \\ y_{m4} = \left[y_{m3} - (m_{th\_V} + 2m_g)\sin\left(\frac{1}{2}\theta_p + \theta_3\right)\right]\sin(\theta_p) \end{cases}$$

$$\begin{cases} x_{m5} = x_{m3} - (m_{th\_V} + 2m_g)\sin(\theta_3) \\ y_{m5} = y_{m3} - (m_{th\_V} + 2m_g)\sin(\theta_3) \end{cases}$$

where $m_{th\_v}$ is the magnet thickness of V-type magnets, and wherein $\theta_{mb}$ and $\theta_{mb}$ are defined as:

$$\theta_{mb} = \tan^{-1}\left(\frac{x_{m1}}{y_{m1}}\right) + 2\sin^{-1}\left(\frac{m_{th\_V} + 2m_g}{2\sqrt{x_{m1}^2 + y_{m1}^2}}\right)$$

$$\theta_3 = \tan^{-1}\left(\frac{y_{m3} - y_{m1}}{x_{m1} - x_{m3}}\right)$$

and $$D_{aux} = D_i - 2(g + b_{th} + 2m_d + m_{w\_spoke}).$$

Also, geometric parameters were identified for the spoke portion of the magnets. The parametric model is as set out below:

$$\begin{cases} x_{m1} = \left(\frac{1}{2}D_i - g - b_{th}\right)\cos\left(\frac{1}{2}\theta_{mt}\right) \\ y_{m1} = -\left(\frac{1}{2}D_i - g - b_{th}\right)\sin\left(\frac{1}{2}\theta_{mt}\right) \end{cases}$$

$$\begin{cases} x_{m2} = x_{m1} \\ y_{m2} = -y_{m1} \end{cases}$$

$$\begin{cases} x_{m3} = \left(\frac{1}{2}D_i - g - b_{th} - m_d\right) \\ y_{m3} = \frac{1}{2}m_{th} + m_g \end{cases}$$

$$\begin{cases} x_{m4} = x_{m3} \\ y_{m4} = -y_{m3} \end{cases}$$

where $\theta_{mt}$ is given as:

$$\theta_{mt} = 2\sin^{-1}\left(\frac{0.8m_{th}}{2\left(\frac{1}{2}D_i - g - b_{th}\right)}\right)$$

and Di=stator inner diameter g=gap between stator and rotor $b_{th}$=thickness of iron bridge at rotor circumference $m_{th}$=magnet thickness $m_g$=magnet air gap clearance $m_a$=radial air gap at base of magnet This parameterized model provides a unique feature for the Y-type rotor, where it is possible to model the transition point between spoke-type, Y-type and V-type rotor topologies. This transition is controlled by the parameter $k_{mw\_spoke}$, which is defined as a ratio of the spoke magnet's width to the rotor yoke according to:

$$m_{w\_spoke} = k_{mw\_spoke}\left(\frac{1}{2}D_i - 2g - r_{sh}\right)$$

Figure 3:
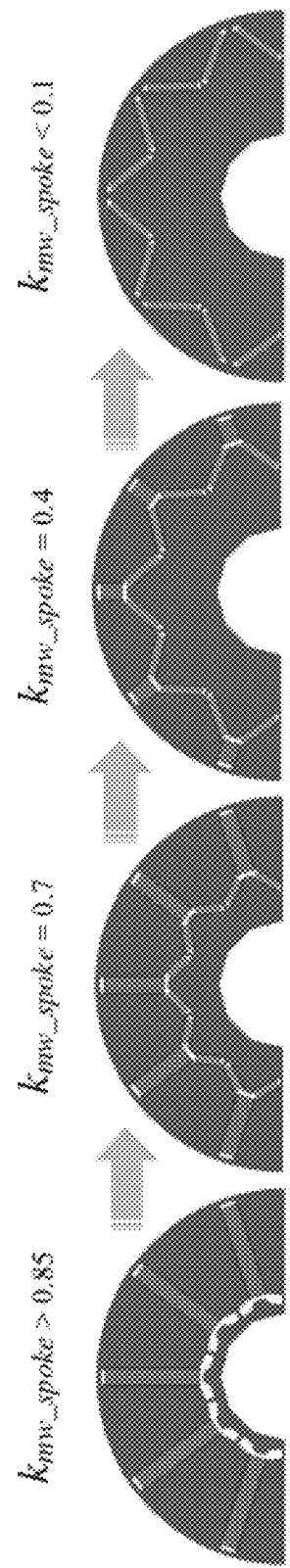
FIG. 3 shows four section halves, which demonstrate the parametric transition from spoke-type to Y-type to V-type.
Figure 4:
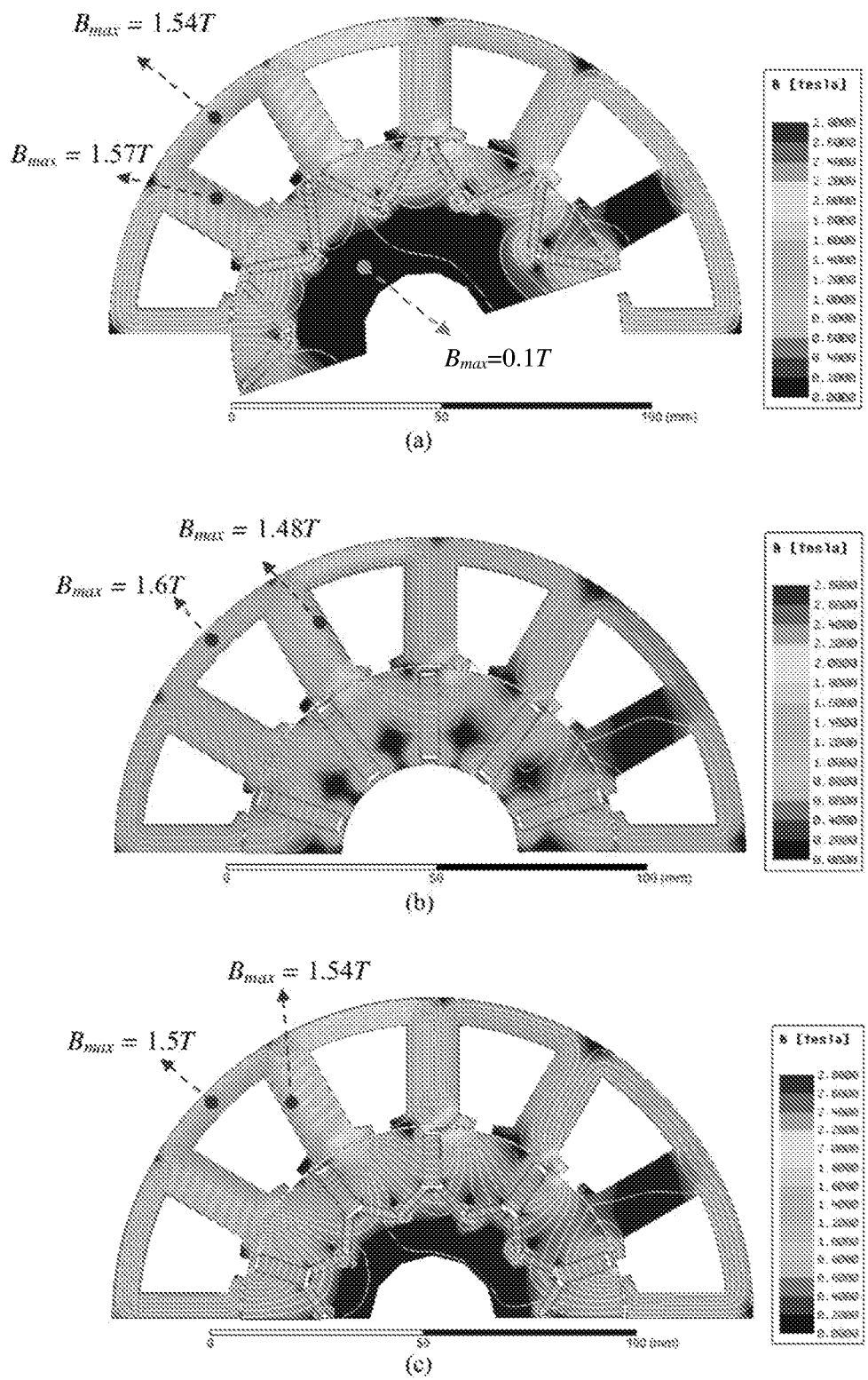
FIG. 4 shows section half views of FEA analyses of flux density distribution and flux lines on the stator and rotor of an ⅖ FSCW configuration at the rated condition and base speed for (a) V-type rotor (prior art), (b) spoke-type rotor (prior art) and (c) Y-type rotor (the present technology)
Figure 5:
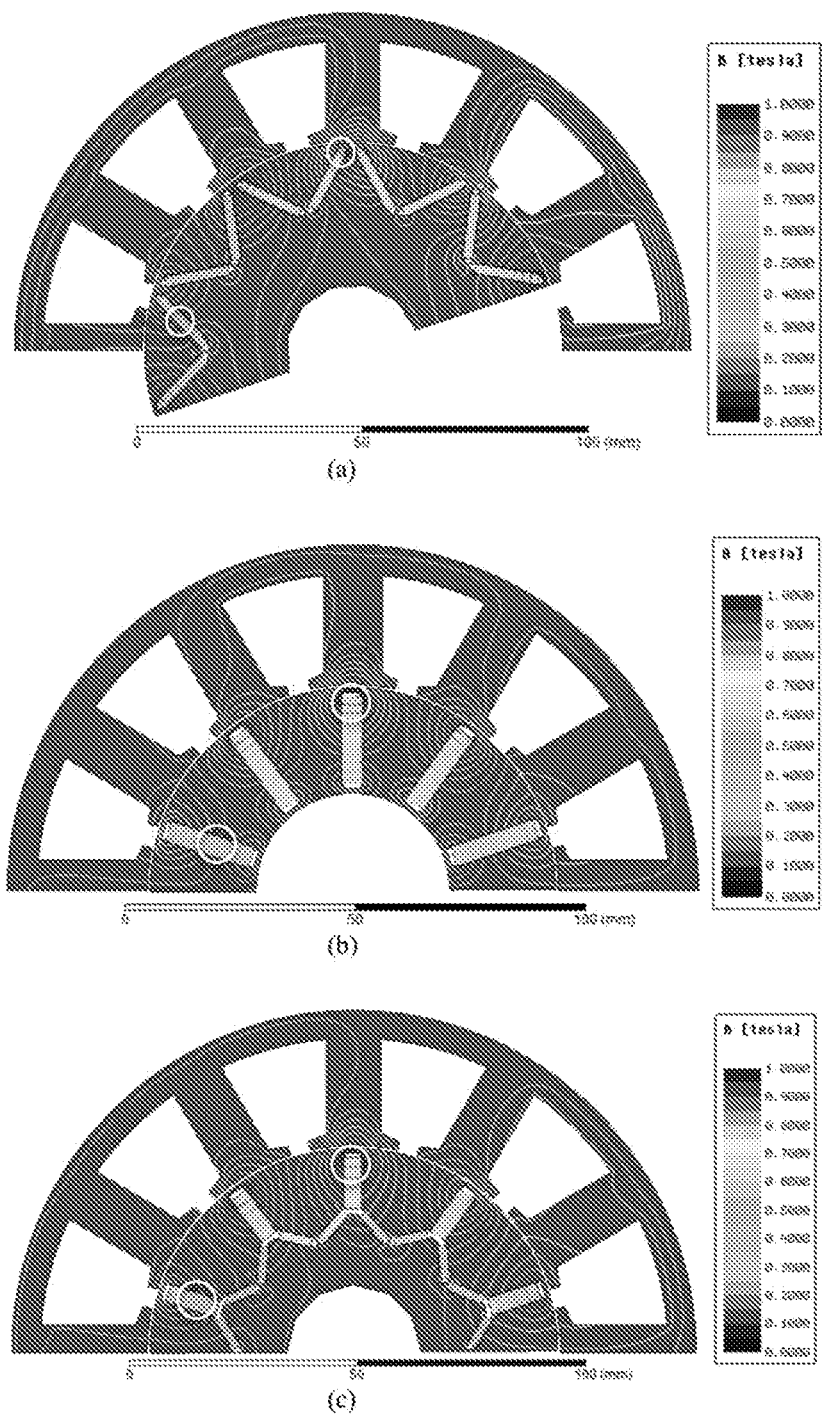
FIG. 5 is a section view of an FEA analysis of distribution of flux density and flux lines on magnets of one configuration at short circuit condition for (a) V-type rotor (prior art) (b) spoke-type rotor (prior art), and (c) Y-type rotor (the present technology)
Figure 6:
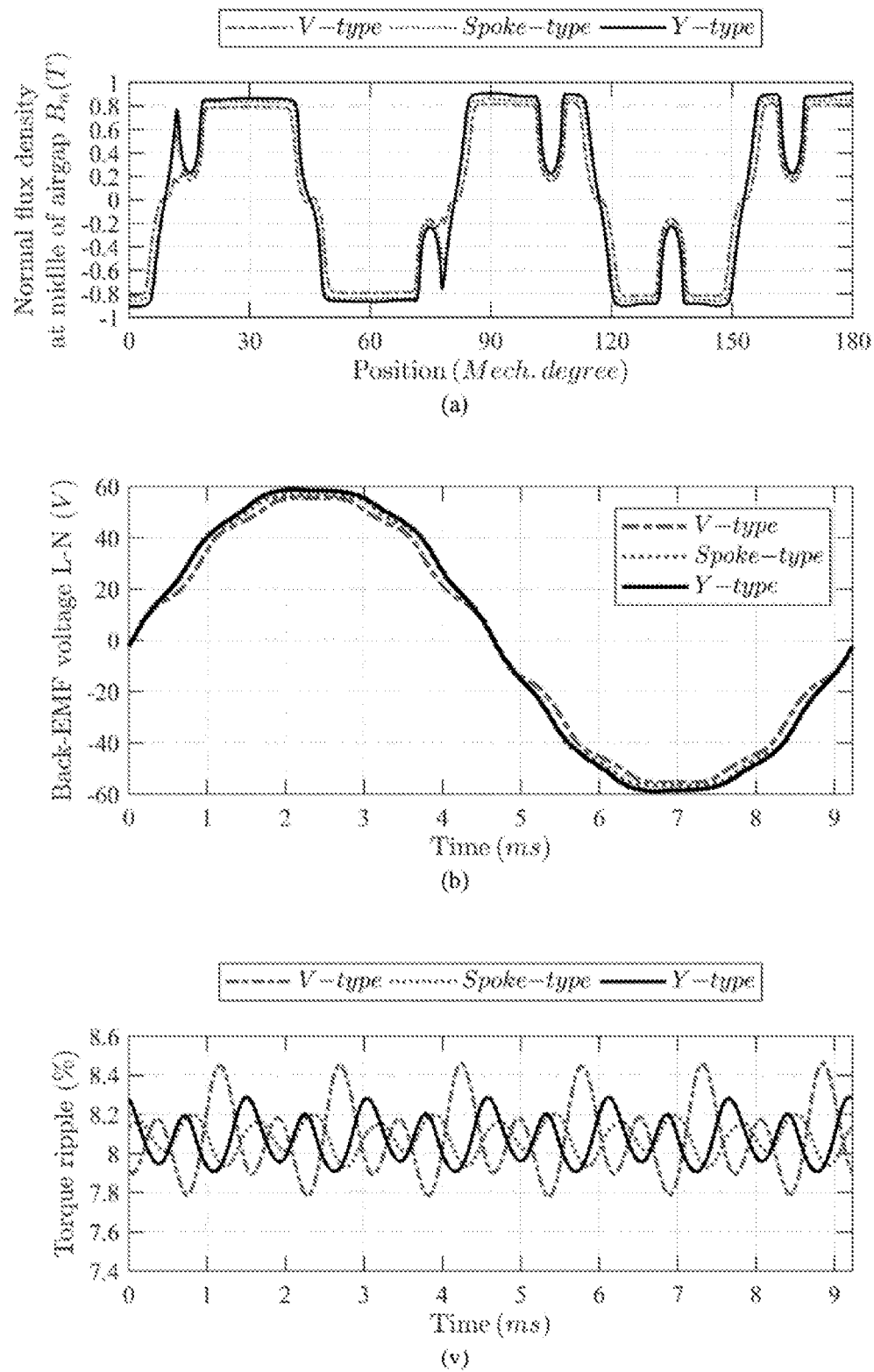
FIG. 6 is a comparison between the performances of the ⅖ FSCW configuration of FIG. 5 with V-type (prior art), spoke-type (prior art), and Y-type rotors (the present technology): 6(a) radial flux density at airgap under no load condition, 6(b) Back-EMF voltage at rated speed, 6(c) Torque ripple at rated load. All results are obtained by FEA.
Figure 7:
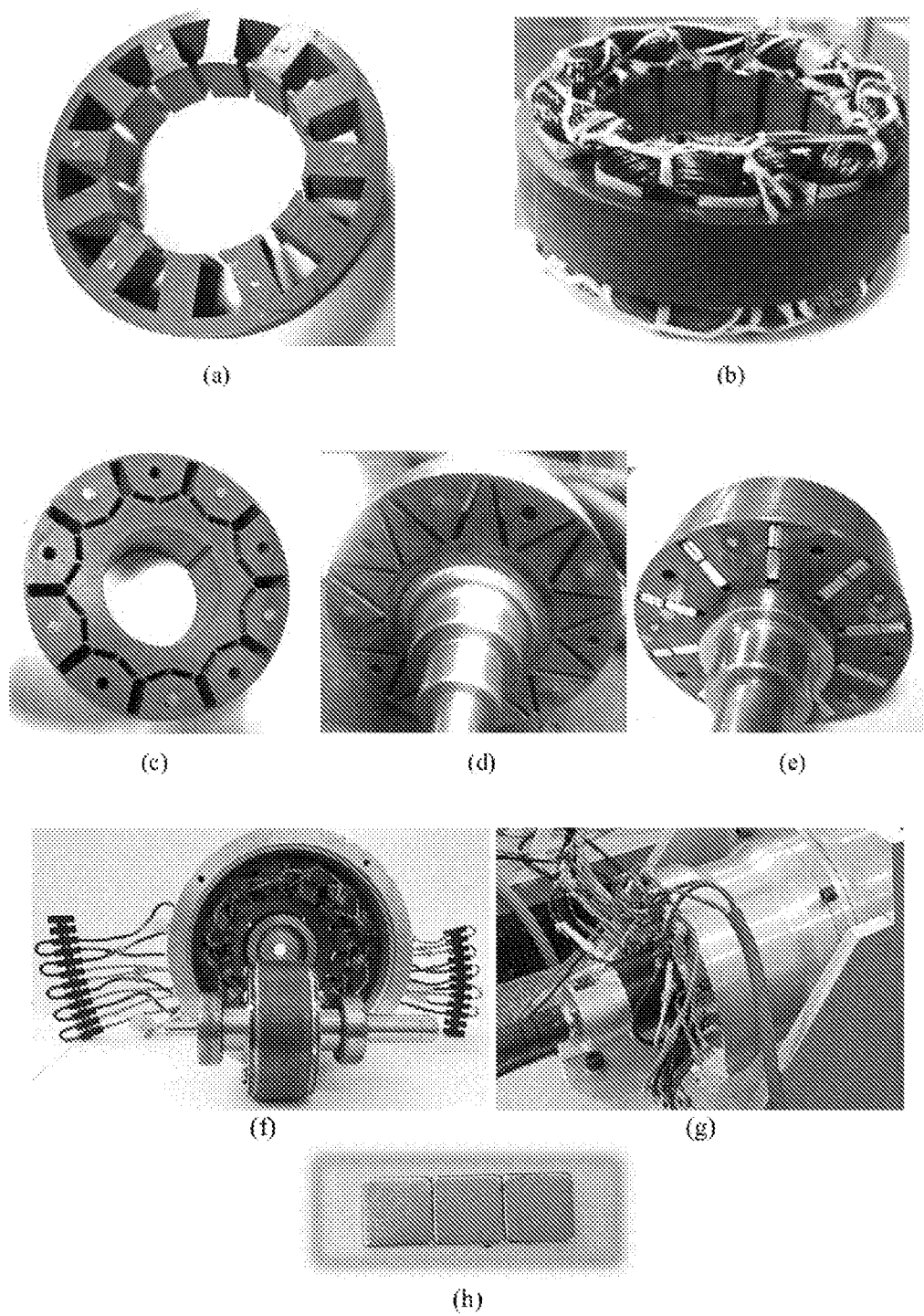
FIG. 7 shows various detail views of components in experimental prototype FSCW IPM machines: (a) Stacked lamination of stator (b) stator with double-layer concentrated winding, (c) Stacked Y-type rotor, (d) Stacked V-type rotor (prior art), (e) Stacked spoke-type rotor (prior art), (f) inserted stator to frame and a complete rotor, (g) the machine with fitted encoder, and (h) segmented magnets before magnetization.

Now, if $K_{mw\_spoke}$>0.85, the rotor topology becomes predominantly spoke-type whereas when $K_{mw\_spoke}$<0.1, the topology reverts to V-type. Between these two values of $K_{mw\_spoke}$ the Y-type topology can be obtained as shown in FIG. 3. By this modification, a morphing FE-based Model of Y-type has been created. The use of the $K_{mw\_spoke}$ in the parameterized model shows that a seamless blend during design parameter changes from spoke-type to Y-type to V-type rotors as shown in FIG. 3. This is a very useful and advantageous feature of the FE-based model developed in the study, by which the optimization package can smoothly switch between the three rotor topologies.

In order to have a feasible geometry, the width of V-type magnets was multiplied by the factor $k_{mw\_spoke}$ as set out below:

$$m_{w\_V} = k_{mw\_spoke}\left[\left(\frac{1}{2}D_i - 2g - b_{th} - m_d - m_{w\_spoke}\right)\sin\left(\frac{1}{2}\theta_p\right) - m_{th\_spoke} + m_s\right]$$

It can be seen from at least FIG. 1 that an arrangement of the new and inventive generally Y-type rotor topology 10 includes a juxtaposition or superposition of a spoke type topology 12 outside a generally V-type rotor topology 16. That is, the spoke-type topology is disposed in an outer rotor annulus 14, disposed radially relatively outside a relatively inner-disposed layer 18 having a V-type rotor topology 16. The parameters are marked on FIG. 1, which assist in defining the geometric position of various landmarks on the Y-type magnets.

Example

A series of experiments were conducted to confirm the modelled performances and to highlight the advantages of the Y-type rotor configuration for the FSCW stator. It was shown that the Y-type rotor which the inventors invented, has an improved torque density with reduced torque ripple compared to the spoke type and V-type rotor topologies when deployed on their own in a rotor.

Three prototype FSCW IPM machines were built.

A common stator was used to avoid any unwanted variation caused by the manufacturing processes such as manual machinery, lamination stacking, the manual process of winding, fitting and alignment. In addition, the frame (housing) and end shields are kept identical. It should be noted that the prototypes are manufactured as individual samples, and they are not from a mass production line.

The stack length of the stator and each of the rotors was 30 mm.

Magnet volume was the same in all three rotors. Hence, the material cost is same for all three prototypes.

The total length of the iron bridges per pole was held the same in the three rotors. The length of the iron bridge directly affects the magnet flux linkage and mechanical integrity of IPM rotors. It was assumed that the magnetic flux path is the same for all three rotors because of the equal total bridge length.

The prototypes were tested at the steady state temperature with fairly similar ambient temperature.

The disclosed V-type, spoke-type and Y-type rotors were fine-tuned by the optimization package to ensure the above conditions where applicable. The final set of the geometric parameters and material specifications of the prototyped designs are listed in the table overleaf.

|  | Parameters | Unit | FSCW prototypes | | |
|---|---|---|---|---|---|
| General specifications | Number of slots ($n_s$) |  | 12 | | |
|  | Number of poles (P) |  | 10 | | |
|  | Rated current | Arms | 6.95 | | |
|  | Current density | [A/mm$^2$] | 5.56 A/mm | | |
|  | Electrical Steel |  | M400 −50 A | | |
|  | PM material |  | NdFeB 35EH | | |
|  | Stack length | [mm] | 30.0 | | |
|  | Cooling System |  | Natural | | |
| Winding specifications | Winding type |  | Double-layer CW | | |
|  | Slot fill factor |  | 0.49 | | |
|  | Wire size | [mm] | 2*0.65 | | |
|  |  |  | 2*0.60 | | |
|  | Number of strands |  | 4 | | |
|  | Number of coils per phase |  | 4 | | |
|  | Number of turns per coil |  | 55 | | |
|  | Active slot area | [mm$^2$] | 300 | | |
|  | Insulation class |  | F | | |
|  | Resistance per phase | [Ω] | 0.53 | | |
| Stator parameters | $D_o$ | [mm] | 152.0 | | |
|  | $D_i$ | [mm] | 90.0 | | |
|  | TWS | [mm] | 14.62 | | |
|  | Yoke | [mm] | 7.0 | | |
|  | $S_o$ | [mm] | 5.04 | | |
|  | $S_{oh}$ | [mm] | 2.09 | | |
|  | Rotor Types: |  | V-type | Spoke-type | Y-type |
| Rotor Parameters | g | [mm] | 0.6 | 0.6 | 0.6 |
|  | $m_{th}$ | [mm] | 2.0 | 4.0 | 4.0 |
|  | $m_{th2}$ | [mm] | — | — | 2.0 |
|  | $m_w$ | [mm] | 17.0 | 17.0 | 10.0 |
|  | $m_{w2}$ | [mm] | — | — | 7.0 |
|  | $w_{th}$ | [mm] | 1.27 | — | — |
|  | Shaft diameter* | [mm] | 40.0 | 40.0 | 40.0 |

The experimental setup for the measurement of the back-EMF was as follows. A Kollmorgen AC synchronous servo motor AKM63N was used as a prime mover to rotate the shaft at arbitrary speeds. The back-EMF was measured using a digital oscilloscope.

The first measurement was conducted with the spoke-type rotor. The measured back-EMF was compared with FEA back-EMF for the speed of 1300 rpm. The measured and FEA line-to-neutral back-EMFs were in very good agreement. Good agreement was also noticed for the other two rotors. Harmonic spectrums of the back EMF waveform were compared, and the Y-type rotor was found to exhibit the highest back-EMF amplitude. A closer look at harmonic spectrum using a normalized value reveals that the V-type rotor had the smallest third harmonics. This is notable because the third harmonic of the back-EMF contribute to the second harmonic of the torque ripple.

The fundamental back-EMF amplitudes versus speeds for each rotor was measured. This is useful because the slope of back EMF vs speed curve gives the magnet flux linkage. It was noted that the magnet flux linkage of the Y-type rotor is the highest among the three rotors. $\lambda_{pred}$ of the Y-type, V-type and the spoke-type prototype are 0.0984 Wb, 0.0897 Wb and 0.0804 Wb, respectively. Thus, $\lambda_{pred}$ of the Y-type is 9.6% higher than that of the V-type and 22.4% higher than that of the spoke-type rotor. It should be noted that magnet volume is the same for all three rotors.

A new standstill torque measurement method was utilised to measure cogging torque and torque ripple. The proposed method provides accurate results and requires a modification on the current hardware arrangement. In the new test, the prototyped machine is connected to a sensitive torque transducer to measure the torque. On the other side of the torque transducer, a handle mechanism is used to lock the shaft. An encoder was also used to measure the rotor position.

For the measurement of cogging torque, in each incremental rotor position, the shaft was gently locked and torque is measured. The incremental steps of the rotor positions should be selected carefully based on the number of cycles of the cogging torque waveform, which is predicted by the least common multiple (LCM). The LCM of 12-slot/10-pole combination is 60. Thus, there are 60 cycles in its cogging torque waveform for 360 mech. degrees. For instance, the cogging torque can be measured every 1 mech. degree. The measured cogging torque of three rotors was compared with FEA results. The cogging torque is shown for one rotor pole pitch, which is 360/10=36 degrees for the prototype FSCW machine. It can be observed that there are six cycles in one pole pitch, resulting in 60 cycles for a mechanical rotation, which is equal to the LCM of 12-slot and 10-pole combination. Very good agreement was observed between the measured and FEA results.

Peak cogging torque is the lowest in the V-type rotor. The cogging torque waveforms of spoke-type and Y-type rotors have 180-degree phase difference with the cogging torque of V-type rotor. In other words, at the same rotor position where the V-type rotor has its maximum positive cogging torque, the spoke-type and Y-type rotors have their minimum negative cogging torque. This phase difference plays an important role in the reduction of total torque ripple especially in the spoke-type rotor topology.

Figure 11:
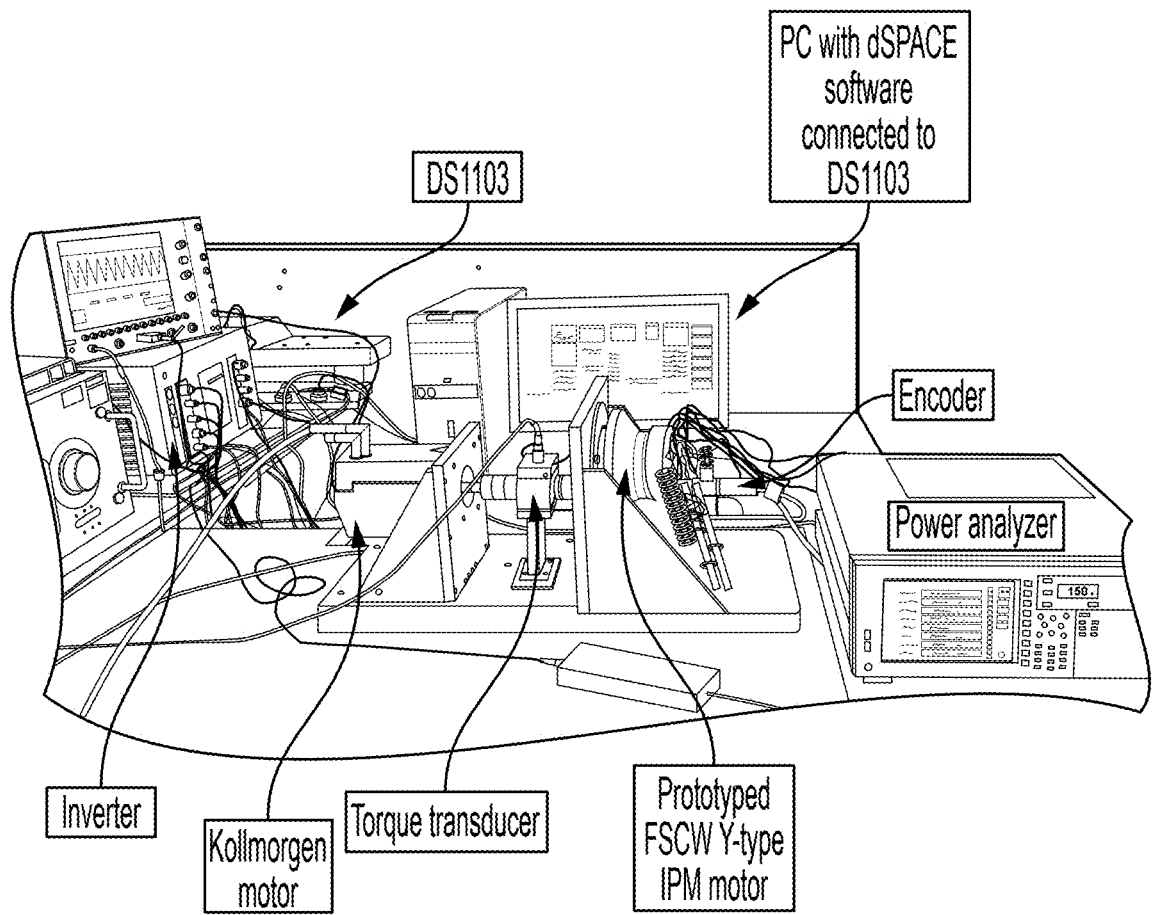
FIG. 11 shows the Experimental test bed for the measurement of steady-state performance using conventional FOC.

For the measurement of torque ripple, the test bed of FIG. 11 was used. The idea of this measurement method was taken from the commonly used FEA torque calculation process in the magnetostatic environment. At a known rotor position, when the shaft is firmly locked by the lock mechanism, three phase currents are supplied to the stator windings using the inverter under the current control scheme.

The d- and q-axis current references are selected based on the operating condition where the torque ripple is desired. The output of the current controllers generates d- and q-axis voltages which are used as references for the space vector modulation (SVM) for the inverter. It should be noted that the supplied currents to the PMSM will be DC current as the rotor is locked and supplied frequency is zero.

Figure 8:
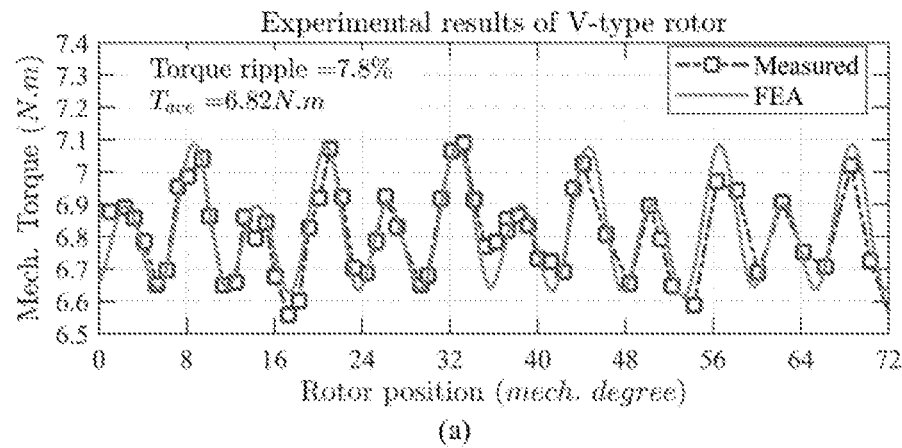
FIG. 8 shows a comparison between the torque ripple obtained by measurement and FEA at the base speed under the rated condition for (a) V-type rotor (prior art), (b) spoke-type rotor (prior art), and (c) Y-type rotor (according to the present disclosure). A standstill method was used to measure torque ripple.
Figure 8:
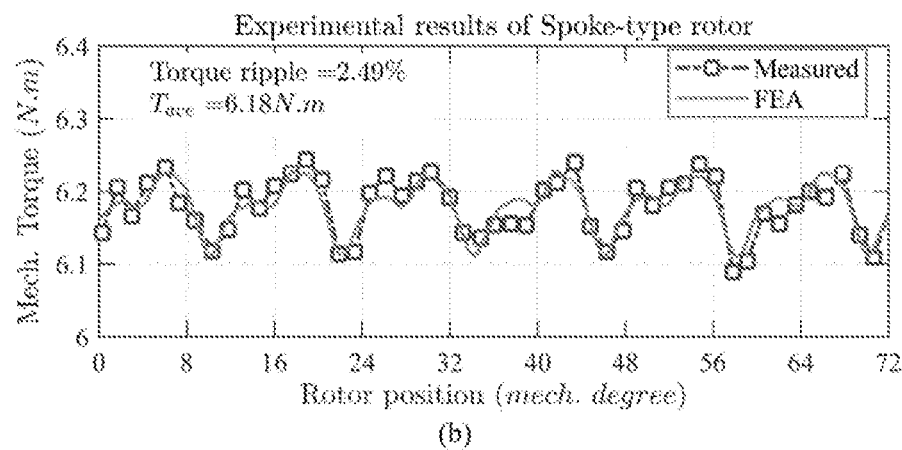
Figure 8:
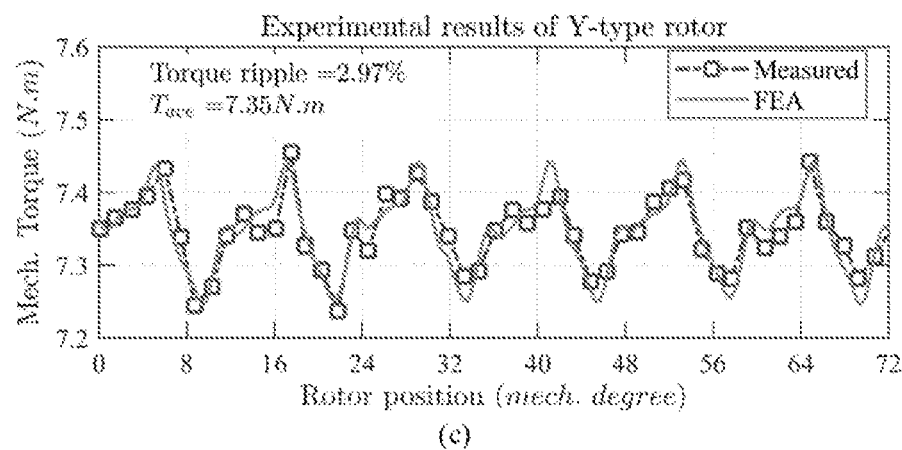

FIG. 8 compares the measured and FEA predicted total torque ripple under the rated condition at the base speed for the three rotors. As discussed above, a quick observation of FIG. 8, it can be concluded that the cogging torque of V-type rotor has an add-on effect to the total torque ripple and hence, the overall torque ripple is higher than the other two. Contrary to this, the negative peak cogging torque of spoke-type and Y-type rotors reduce the overall peak torque ripple. Thus, a significant reduction of torque ripple can be seen in those two rotors.

Therefore, although the V-type rotor has the smallest cogging torque (0.12 Nm peak to peak), its overall torque ripple is the highest—7.8% of the rated torque, whereas, the spoke-type and Y-type rotors have torque ripple—2.49% and 2.97%, respectively. The average torque of Y-type rotor is 7.35 Nm, which is 18.9% and 7.7% higher than the average torque 6.18 Nm of the spoke-type rotor and 6.82 Nm of V-type rotors, respectively. As a result, the Y-type rotor has a higher torque density with low torque ripple.

d- and q-axis inductances $L_d$ and $L_q$ are the other two key parameters of the IPM machine. A large variation of these two parameters with current can cause performance deterioration. $L_d$ and $L_q$ of the three prototype IPM machines were measured.

Figure 9:
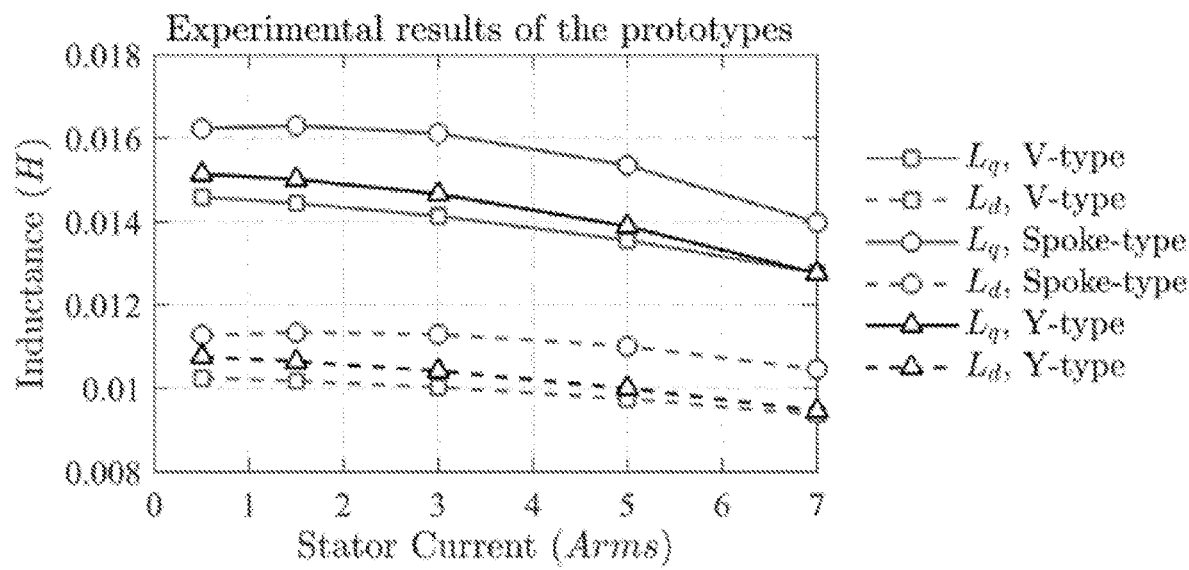
FIG. 9 shows the variation of $L_q$ and $L_d$ with respect to stator current obtained by standstill flux linkage test the prototypes with V-type, spoke-type and Y-type rotors.
Figure 10:
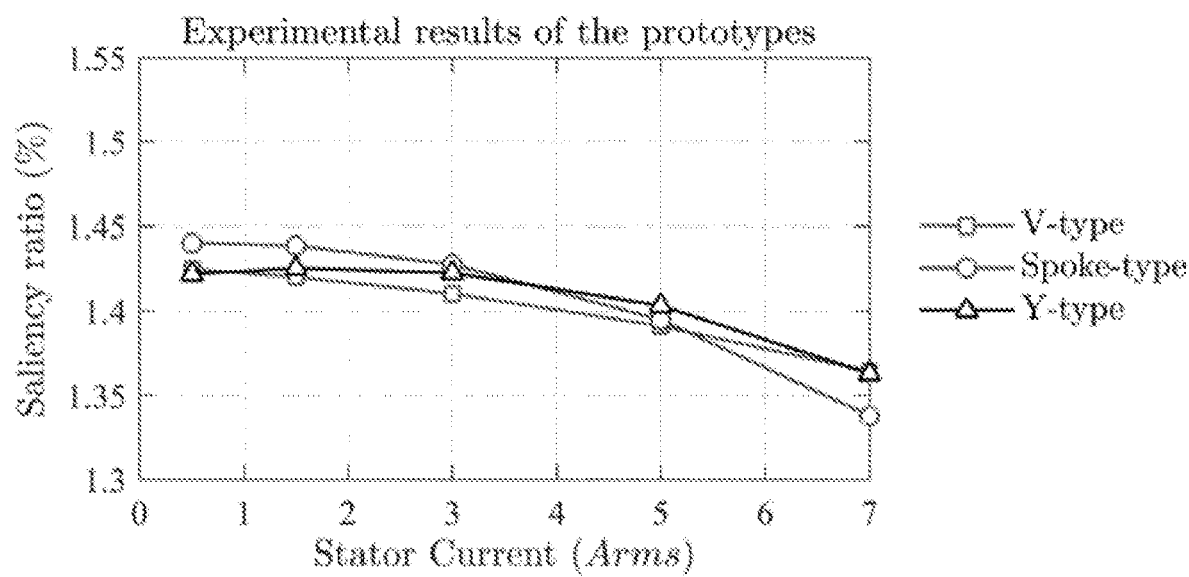
FIG. 10 shows the variation of saliency ratio with respect to stator current obtained by standstill flux linkage test the prototypes with V-type, spoke-type and Y-type rotors.

The variation of $L_d$ and $L_q$ with respect to stator current for three machines are shown in FIG. 9. It can be seen that the spoke-type rotor has the highest inductance among the three rotors. FIG. 10 compares the saliency ratios of the three rotors. The V-type and Y-type rotors demonstrate higher saliency ratio than spoke-type rotor under the rated current.

To analyze the steady-state performances of the three prototypes, they were run in the full operating range under full load using conventional field oriented control. Torque versus speed and power versus speed characteristics were measured. Efficiencies under various operating conditions were also measured using standard efficiency measurement method.

The testbed is shown in FIG. 11. A Kollmorgen motor operating in the generation mode was used as a load. The loads were varied using a simple chopper control circuit. The shaft torque was measured by a torque transducer HBM T22/20 Nm. The shaft speed was measured by using an encoder ROD 426 with 2000 lines and DSP1103. A power analyzer YOKOGAWA WT1800 was used to measure apparent power, active power, supply current, terminal voltage and power factor.

Figure 12:
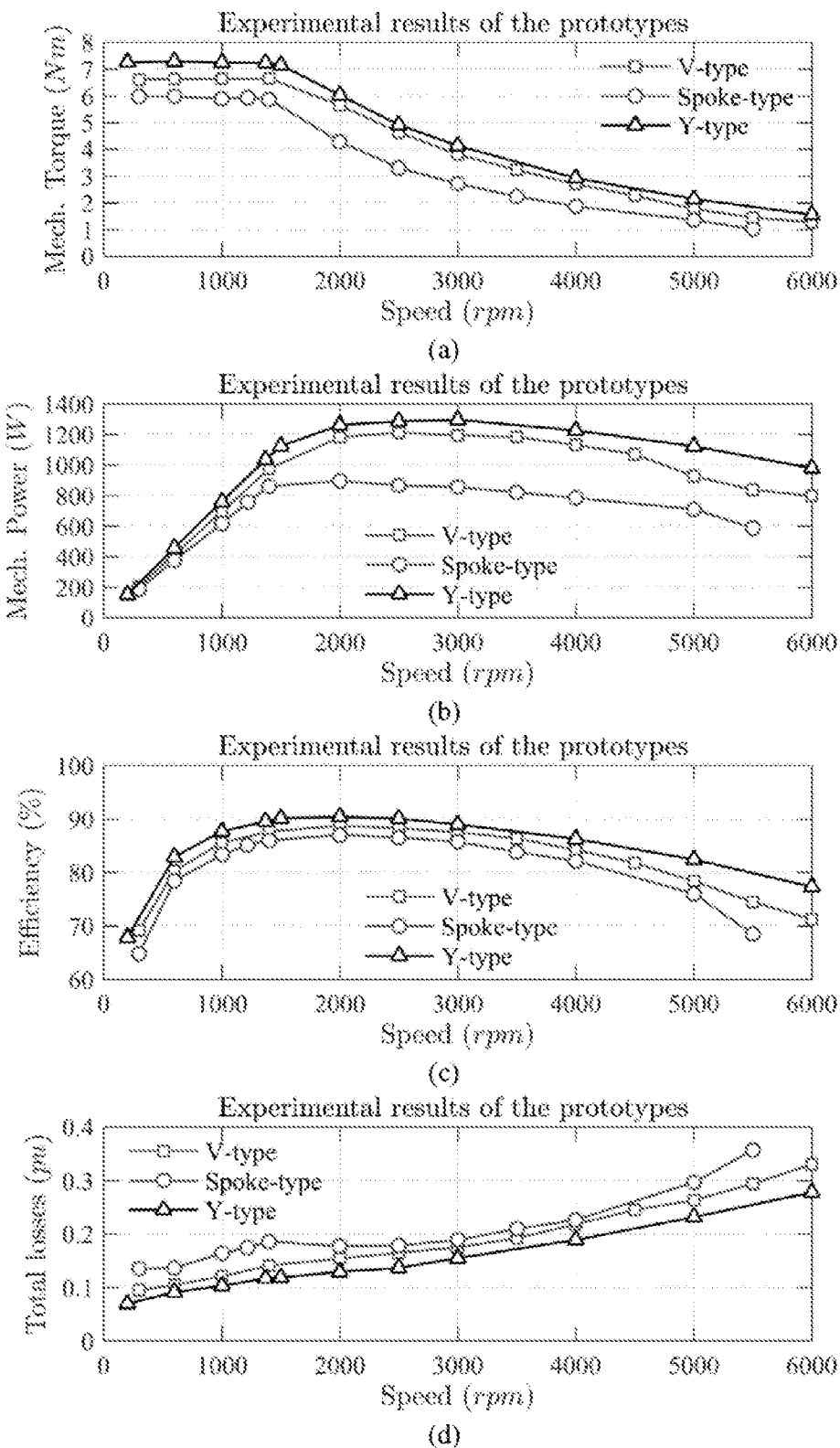
FIG. 12 shows measured performance of the prototypes with V-type, spoke-type and Y-type rotors over constant torque and constant speed regions: (a) torque-speed characteristic, (b) power-speed characteristic, (c) Efficiency-speed characteristic, and (d) total loss Vs. speed characteristic.

The performance characteristics of the prototypes with three rotors under constant torque and constant power regions are compared in FIG. 12. MTPA trajectory control was used at constant torque region from standstill to the base speed. Above the base speed, the flux-weakening algorithm was employed to maintain the rated voltage. As a general observation, the FSCW IPM machine with Y-type rotor presents higher efficiency, higher mechanical power and higher torque over the entire range of operation in comparison with V-type and spoke-type rotors. Also, the Y-type rotor reaches a CPSR of 1:4.5, which is 36% higher than the CPSR of 1:3.3 for the V-type and spoke-type rotor. It should be noted that different rated powers are considered for three prototypes based on their capabilities. The maximum power of the Y-type machine is 1.3 kW, which is 7% and 44.7% higher than the V-type and spoke-type machines, respectively. If the rated power of the spoke-type rotor (756 W) is considered as the base power for the three prototypes, CPSR of Y-type and V-type machines exceed 1:7.

The difference in CPSR can be explained by the characteristic current. The spoke-type machine has the characteristic current 0.78 pu which is lower than the other two.

A novel method is employed for the estimation of $I_{ch}$. The Y-type rotor demonstrates higher $I_{ch}$, due to its higher $\lambda_{pred}$ and smaller $L_d$, where the spoke-type rotor presents lower $I_{ch}$, due to its low $\lambda_{pred}$ and high $L_d$. For the same reason, the output power of the spoke-type rotor drops after 5000 rpm. Also, the maximum speed of the spoke-type rotor is 5500 rpm. After this speed, its developed torque is not enough to overcome the rotational-related losses. The key performances of the three prototypes are summarized in the Table below

| Performance | Units | V-type | Spoke type | Y-type |
|---|---|---|---|---|
| Torque density | [Nm/kg] | 1 | 0.89 | 1.09 |
| Torque per magnet weight | [Nm/kg] | 1 | 0.89 | 1.09 |
| Efficiency at base speed | [%] | 1 | 0.97 | 1.02 |
| Total loss | pu | 1 | 1.24 | 0.83 |
| $\gamma_{max}$ | [deg.] | 1 | 0.97 | 0.97 |
| CPSR | | 1 | 1.00 | 1.36 |
| Torque ripple | [%] | 1 | 0.32 | 0.38 |
| Saliency ratio | | 1 | 0.98 | 1.00 |
| Power factor | | 1 | 0.94 | 1.04 |

The measured performance characteristics of the prototypes were compared over the entire of operation range, which was obtained through several performance evaluations over sample load points.

The high-efficiency regions are extended in all directions for the prototype with the Y-type rotor in comparison with the V-type and spoke-type rotors. The maximum efficiency of the Y-type rotor reached 92%, which is 3% higher than the maximum efficiency of the other two rotors. It should be noted that all the performances are measured by the steady state temperature.

The distribution of mechanical power on the torque-speed plane for three prototypes was tested. The prototype with Y-type rotor provides higher mechanical power for the entire range of speed, especially after the speed of 4500 rpm where the mechanical power of the V-type and spoke-type rotors falls rapidly.

The supply current was compared. The input current of the prototypes with V-type and spoke-type rotors drop from the speed of 4500 rpm and 2500 rpm, respectively. These speeds are corresponding to the operating points where the negative $i_d$ reaches to the negative characteristic current, which is the limit for d-axis current. The power factor maps are shown in FIG. 3.16. The Y-type and V-type rotors present higher power factor for the entire range of operation in comparison with the spoke-type rotor. Evidently, the high power factor contours of the spoke-type rotor retract faster as the speed increases.

CLARIFICATIONS

Modifications and improvements to the invention will be readily apparent to those skilled in the art. Such modifications and improvements are intended to be within the scope of this invention.

The claims defining the present invention are as follows:

1. A Y-type IPM rotor wherein a plurality of generally Y-shaped internal permanent magnets are disposed around a circumferential region of the rotor, each of the generally Y-shaped permanent magnets including a stem and two diverging arms connected to the stem via an iron bridge, the diverging arms extending from a head end of the stem, wherein each of the generally Y-shaped permanent magnets is oriented such that a base of the stem of each said magnet is disposed adjacent the rotor circumference.

2. A Y-type IPM machine which includes:
a rotor wherein a plurality of generally Y-shaped internal permanent magnets are disposed around a circumferential region of the rotor, each of the generally Y-shaped permanent magnets including a stem and two diverging arms connected to the stem via an iron bridge, the diverging arms extending from a head end of the stem, wherein each of the generally Y-shaped permanent magnets is oriented such that a base of the stem of each said magnet is disposed adjacent the rotor circumference.

3. The Y-type IPM rotor in accordance with claim 1, wherein the ratio of stem magnet width to rotor yoke width is between 0.01 and 0.99.

4. The Y-type IPM rotor in accordance with claim 1, wherein the ratio of stem magnet width to rotor yoke width is about 0.1, 0.15, 0.2, 0.25, 0.3, 0.35, 0.4, 0.45, 0.5, 0.55, 0.6, 0.65, 0.7, 0.75, or 0.8.

5. The Y-type IPM rotor in accordance with claim 1, wherein the ratio of arm magnet width to rotor yoke width is between about 0.25 and about 1.5.

6. The Y-type IPM rotor in accordance with claim 1, wherein the ratio of arm magnet width to rotor yoke width is about 0.3, 0.35, 0.4, 0.45, 0.5, 0.55, 0.6, 0.65, 0.7, 0.75, 0.8, 0.85, 0.9, or 0.95.

7. The Y-type IPM rotor in accordance with claim 1, wherein the ratio of arm magnet width to rotor yoke width is between about 1 and 1.3.

8. The Y-type IPM rotor in accordance with claim 1, wherein the ratio of arm magnet width to rotor yoke width is about 1.05, 1.1, 1.15, 1.2, or 1.25.

9. The Y-type IPM rotor in accordance with claim 1, wherein the thickness of the stem magnet is between about 0.5 mm and 50 mm.

10. The Y-type IPM rotor in accordance with claim 1, wherein the thickness of the stem magnet may be about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47 48, or 49 mm, depending on a number of slots and poles.

11. The Y-type IPM rotor in accordance with claim 10, wherein the number of slots is between about 4 and 84.

12. The Y-type IPM rotor in accordance with claim 10, wherein the number of poles is between about 4 and 84.

13. The Y-type IPM rotor in accordance with claim 1, wherein the thickness of the stem magnet is between about 3 mm and 6 mm, when a number of slots is 12 and a number of poles is 10.

14. The Y-type IPM rotor in accordance with claim 1, wherein the thickness of the arms of the magnet are between about 1.5 mm and 5 mm, when a number of poles is 12 and a number of slots is 10.

15. The Y-type IPM rotor in accordance with claim 1, wherein the thickness of the arm magnets is about 0.1, 0.25, 0.3, 0.5, 0.66, 0.75, 0.85, 1.0, 1.1, 1.2, 1.3, 1.4, 1.6, 1.7, 1.8, 1.9, 2, 2.25, 2.5, 2.75, 3, 3.25, 3.5, 3.75, 4, 4.25, 4.5, 4.75, 5, 5.5, 6, 6.5, 7, 7.5, 8, 8.5, 9, 9.5, 10, 11, 12, 13, 14, 15, 16, 17, 18, 19, 20, 21, 22, 23, 24, or 25 mm, depending on a number of slots and poles.

16. The Y-type IPM rotor in accordance with claim 1, wherein the thickness of the iron bridge between the stem and the diverging arms of each generally Y-shaped permanent magnet is between about 0.1 and 10 mm.

17. The Y-type IPM rotor in accordance with claim 1, wherein the thickness of the iron bridge between the stem and the diverging arms of each generally Y-shaped permanent magnet is about 0.25, 0.5, 0.75, 1, 1.5, 2, 2.5, 3, 3.5, 4, 4.5, 5, 5.5, 6, 6.5, 7, 7.5, 8, 8.5, 9, 9.5, or 10 mm.

18. The Y-type IPM rotor in accordance with claim 1, wherein the magnet air gap is between about 0.1 and 5 mm.

19. The Y-type IPM rotor in accordance with claim 1, wherein the iron bridge thickness between outer ends of two diverging arms is between about 0.1 and 5 mm.

20. The Y-type IPM rotor in accordance with claim 1, wherein the Y-type IPM rotor is configured to be utilized within a Y-type IPM machine that is a Fractional Slot machine.

21. The Y-type IPM rotor in accordance with claim 1, wherein the Y-type IPM rotor is configured to be utilized within a Y-type IPM machine that is a Distributed Winding machine.

22. The Y-type IPM rotor in accordance with claim 1, wherein the Y-type IPM rotor is configured to be utilized within a Y-type IPM machine that is a Concentrated Winding machine.

23. The Y-type IPM rotor in accordance with claim 1, wherein the Y-type IPM rotor is configured to be utilized within a Y-type IPM machine that is a Fractional Slot Concentrated Winding machine (FSCW).

24. The Y-type IPM rotor in accordance with claim 1, wherein the geometric parameters of the stem portion of the rotors can be defined as set out in the parametric equation set out below $$\begin{cases} x_{m1} = \left(\frac{1}{2}D_i - g - b_{th}\right)\cos\left(\frac{1}{2}\theta_{mt}\right) \\ y_{m1} = -\left(\frac{1}{2}D_i - g - b_{th}\right)\sin\left(\frac{1}{2}\theta_{mt}\right) \end{cases}$$

$$\begin{cases} x_{m2} = x_{m1} \\ y_{m2} = -y_{m1} \end{cases}$$

$$\begin{cases} x_{m3} = \left(\frac{1}{2}D_i - g - b_{th} - m_d\right) \\ y_{m3} = \frac{1}{2}m_{th} + m_g \end{cases}$$

$$\begin{cases} x_{m4} = x_{m3} \\ y_{m4} = -y_{m3} \end{cases}$$

where $\theta_{mt}$ is given as:

$$\theta_{mt} = 2\sin^{-1}\left(\frac{0.8m_{th}}{2\left(\frac{1}{2}D_i - g - b_{th}\right)}\right)$$

and Di=stator inner diameter
g=gap between stator and rotor
$b_{th}$=thickness of iron bridge at rotor circumference
$m_{th}$=magnet thickness
$m_g$=magnet air gap clearance
$m_d$=radial air gap at base of magnet.

25. The Y-type IPM rotor in accordance with claim 1, wherein the geometric parameters for the vertices of the diverging arm portion of the magnets can be defined by the parametric equations set out below $$\begin{cases} x_{m1} = \sqrt{\left(\frac{1}{2}D_{aux} - g - 0.5\right)^2 - \left(\frac{1}{2}m_{th\_spoke} + m_{th\_V} + 2m_g - b_1\right)^2} \\ y_{m1} = \left(\frac{1}{2}m_{th\_spoke} + m_{th\_V} + 2m_g - b_1\right) \end{cases}$$

$$\begin{cases} x_{m2} = \left(\frac{1}{2}D_{aux} - g - 0.5\right)\cos(\theta_{mb}) \\ y_{m2} = \left(\frac{1}{2}D_{aux} - g_o - 0.5\right)\sin(\theta_{mb}) \end{cases}$$

$$\begin{cases} x_{m4} = \left[x_{m3} - (m_{th\_v} + 2m_g)\sin\left(\frac{1}{2}\theta_p + \theta_3\right)\right]\cos(\theta_p) \\ y_{m4} = \left[y_{m3} - (m_{th\_v} + 2m_g)\sin\left(\frac{1}{2}\theta_p + \theta_3\right)\right]\sin(\theta_p) \end{cases}$$

$$\begin{cases} x_{m5} = x_{m3} - (m_{th\_v} + 2m_g)\sin(\theta_3) \\ y_{m5} = y_{m3} - (m_{th\_v} + 2m_g)\sin(\theta_3) \end{cases}$$

where $m_{th\_v}$ is the magnet thickness of V-type magnets, and wherein $\theta_{mb}$ and $\theta_{mb}$ are defined as:

$$\theta_{mb} = \tan^{-1}\left(\frac{x_{m1}}{y_{m1}}\right) + 2\sin^{-1}\left(\frac{m_{th\_V} + 2m_g}{2\sqrt{x_{m1}^2 + y_{m1}^2}}\right)$$

$$\theta_3 = \tan^{-1}\left(\frac{y_{m3} - y_{m1}}{x_{m1} - x_{m3}}\right)$$

and $D_{aux} = D_i - 2(g + b_{th} + 2m_d + m_{w\_spoke})$.

* * * * *